April 20, 1954  S. F. GIANNETTE  2,675,816
GAS LEAK DETECTOR
Filed July 10, 1952  2 Sheets-Sheet 1
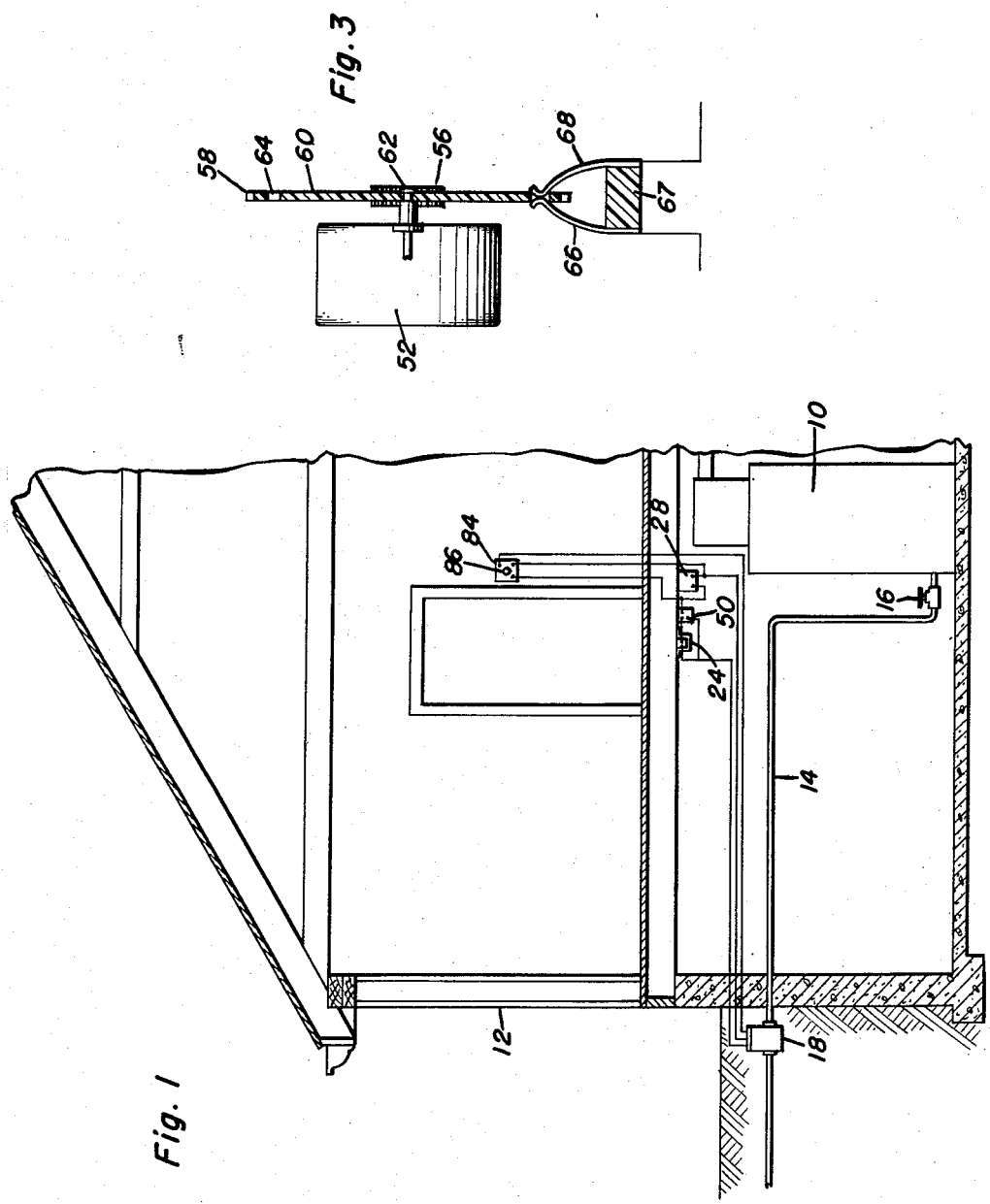
Sam F. Giannette
INVENTOR.
BY

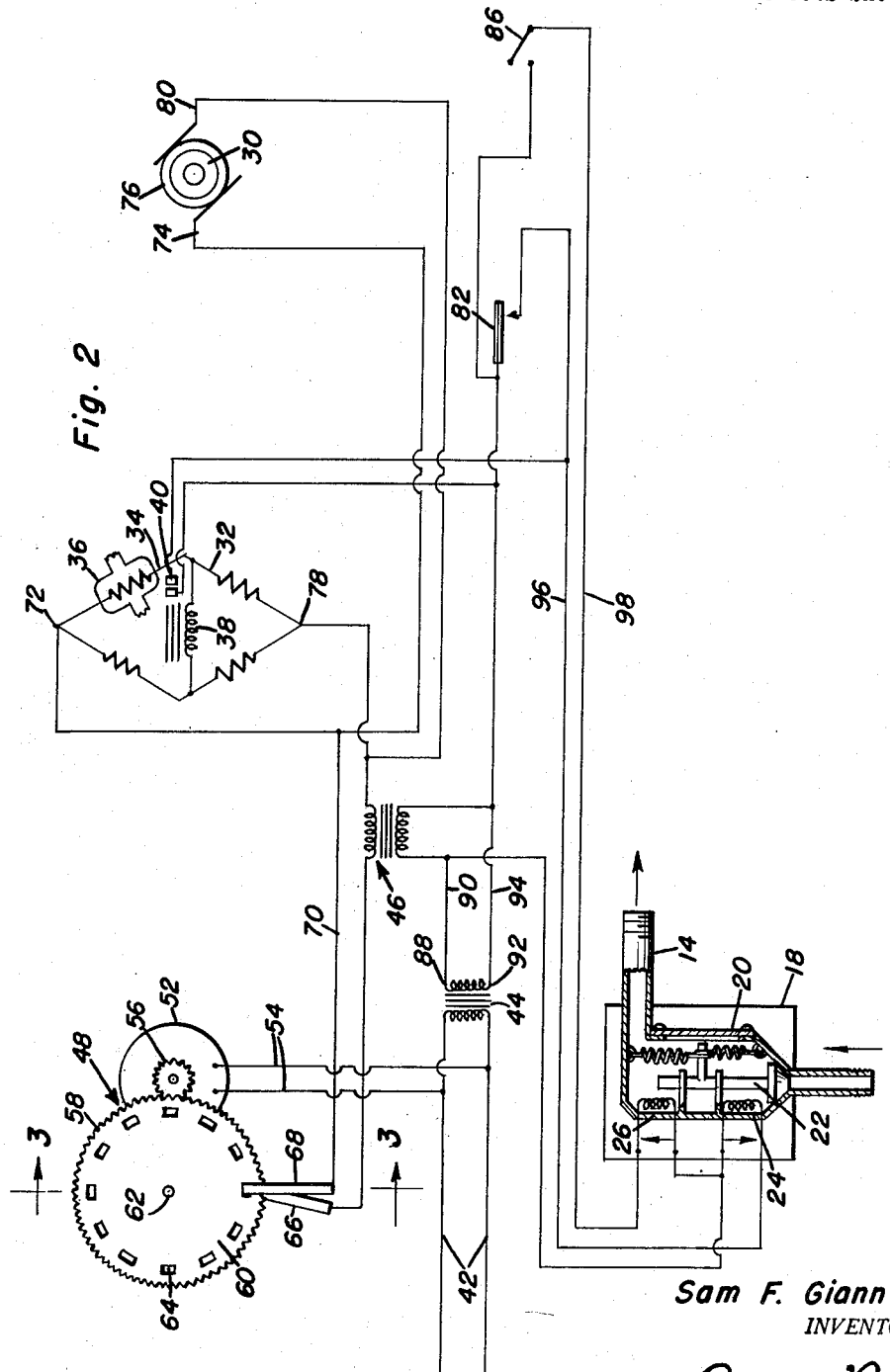

Patented Apr. 20, 1954

2,675,816

UNITED STATES PATENT OFFICE 2,675,816

GAS LEAK DETECTOR

Sam F. Giannette, Pueblo, Colo.

Application July 10, 1952, Serial No. 298,104

1 Claim. (Cl. 137—80)

1

This invention relates to a gas leak detector, and particularly to a gas leak detector for detecting the leaking of gas and shutting off the same to prevent explosion or other deleterious effect.

In the utilization of gas in various gas-consuming furnaces, such as fuel for a heating furnace or other operation, there is considerable danger that the gas pilot flame will be extinguished or that vibration of some portion of the structure or the building in which the device is housed may cause a breakage of the gas line or, for some other reason, the gas may leak into the building. Such leaking gas may have serious deleterious effect on the person or building involved. Not only may the leaking gas cause an explosion and start a fire which might destroy the building, but the gas might seriously affect the health of any person who might become contaminated therewith.

The present invention provides a detector system responsive to the presence of gas in the atmosphere in some portion of the building, preferably in a portion where escaping gas would be expected to accumulate and a valve operated by the detecting system placed outside of the building to shut off the gas flow in the event of excessive leakage about the device utilizing the gas in the building.

It is, accordingly, an object of the invention to provide a leak detector.

It is a further object of the invention to provide a safety system utilizing a leak detector. It is a further object of the invention to provide a safety system periodically sampling the gas adjacent to a gas utilizing device.

It is a further object of the invention to provide a device for shutting off gas flow in the event of leakage of gas in a building.

Other objects and many of the attendant advantages of the present invention will be apparent from the following detailed description taken in conjunction with the accompanying drawings, in which:

Figure 1 is a cut away view of a structure having the protective system installed therein;

Figure 2 is a schematic wiring diagram of the protective apparatus; and

Figure 3 is a section through the timer switch mechanism taken substantially on a plane indicated by the line 3—3 of Figure 2.

In the exemplary embodiment of the invention, a gas utilizing device, such as a furnace 10, is housed in a suitable structure such as a building 12 and gas is introduced into the building and to

2 the furnace by means of the gas conduit 14. The usual control valve 16 is placed in the line 14 adjacent to the furnace 10 to control the flow of gas therein.

The leak detector and protective system according to the invention comprises a valve chamber 18 placed outside of the building 12 and containing a valve body 20. A valve actuating member 22 is placed in the valve body 20 and a coil 24 is operative when energized to move the rod 26 to move the valve to closed position. A similar coil 26 is associated with the rod 22 and when energized is operative to move the rod 22 to a position to open the valve in the body 20.

A leak detector 28 is placed adjacent to the apparatus 10 and is provided with a sampling device including a motor-driven blower 30 and a balanced impedance bridge 32 of the Wheatstone bridge type, one arm 34 of the Wheatstone bridge 32 being enclosed in a chamber 36 so that the sample of air picked up by the motor-driven fan 30 will be delivered into proximity with the arm 34 of the Wheatstone bridge to control the impedance of the arm 34, as is well known.

A relay coil 38 is connected across the bridge 32 and, as is well known, is responsive to unbalance of currents in the arms of the bridge 32 to actuate the relay contacts 40.

A supply circuit 42 supplies electrical energy for the testing system and is stepped down to a suitable voltage by a transformer 44. The output terminals of the transformer 44 are connected to a timer device which includes a stepup transformer 46 and a timing switch 48, the whole being encased in a suitable housing 50. The timing device 48 comprises a motor 52 connected to the supply circuit 42 by a suitable energizing circuit 54. The motor 52 is provided with a driven gear 56 which contacts and is in driving engagement with gear teeth 58 on the periphery of an insulating disk 60 journaled on a shaft 62 on a suitable support, not shown. The disk 60 is provided adjacent the periphery thereof with an annular row of apertures 64 which are of such size that contact fingers 66 and 68 may readily make contact therethrough with the fingers 66 and 68 being so shaped that rotation of the disk 60 will cause the fingers 66 and 68 to be separated by the insulation portion of the disk 60, except during the interval when the fingers 66 and 68 are in contact through one of the apertures 64.

Fingers 66 and 68 control a conductor 70 connected to one terminal of the transformer 46 which is connected to one terminal 72 of the bridge 32 and to one terminal 74 of the motor 76 driving the blower 30. The opposite terminal of the transformer 46 is directly connected to the terminal 78 of the bridge 32 and the terminal 80 of the motor 76.

The thermostatic switch 82 is connected in parallel with the contacts 40 and is preferably mounted in a housing 84 at some convenient place in the building 12. A reset switch 86 is likewise preferably mounted in a housing 84 for utilization in resetting the valve stem 22 as will presently be described.

One terminal 88 of the transformer 44 is common to the transformer primary of the transformer 46 and to the coils 24 and 26, being connected by means of a conductor 90. The opposite terminal 92 is connected to a conductor 94 which is common to the contacts 40, the thermoswitch 82 and the reset switch 86. Contacts 40 and the thermoswitch 82, connected in parallel therewith, energize the coil 24 by means of the conductor 86. The reset switch 86 likewise energizes the coil 26 by means of the conductor 98.

In the operation of the detector and protective system according to the invention, the device 10 will be operated as may be desired and controlled by means of the valve 16. A motor-driven fan or blower 30 will deliver samples of the atmosphere adjacent to the device 10 into the chamber 36 and the motor 76 and the bridge 32 will be periodically energized by means of the timer device 48 so that any excessive gas in the atmosphere adjacent the device 10 will cause an unbalance of the bridge 32 so that the coil 38 will be energized by the unbalance in the bridge 32 and close the contacts 40 to energize the coil 24 and close the valve in the housing 20 to prevent further flow of gas into the building. Likewise in the event of excessive temperature in the building 12, the thermostatic switch 82 will close its contacts to energize the coil 24 and close the valve in the housing 20 and prevent further overheating of the building. After the shutdown has been noted and the disturbance controlled, the switch 86 may be pressed to energize the coil 26 and open the valve in the housing 20 so that gas may again flow through the conduit 14 and the valve 16 to the gas-consuming device 10.

For purposes of exemplification, a particular embodiment of the invention has been shown, and described according to the best present understanding thereof. It will be apparent to those skilled in the art that changes and modifications can be made therein without departing from the true spirit of the invention.

Having described the invention, what is claimed as new is:

For use in a building housing a gas utilizing device and having a conduit introducing gas into said device from outside said building and including a safety valve located exteriorly of said building, a safety system comprising, a motor-operated blower, the intake for said blower being located in proximity to said gas-utilizing device, an electrical impedance bridge, a relay coil connected across said bridge and energized in response to unbalance in said bridge, one arm of said bridge being exposed to the output of said blower, an electric supply circuit, a motor-driven timing switch energized from said circuit, circuit means for applying energy to said bridge and said blower, said switch periodically closing said circuit means for energizing said blower and said bridge, a valve actuating coil, an actuating circuit for said coil, contacts operated by said relay for determining the energization of said actuating coil, a thermostatic switch connected in parallel with said contacts.

References Cited in the file of this patent

UNITED STATES PATENTS

| Number | Name | Date |
| --- | --- | --- |
| 468,185 | Webster | Feb. 2, 1892 |
| 1,304,208 | Shakespear | May 20, 1919 |
| 1,523,759 | Dougherty | Jan. 20, 1925 |
| 2,055,031 | Hutchings | Sept. 22, 1936 |
| 2,219,391 | Jacobson | Oct. 29, 1940 |
| 2,240,397 | Holleman | Apr. 29, 1941 |
| 2,341,727 | Krough | Feb. 15, 1944 |
| 2,484,202 | Wintermute | Oct. 11, 1949 |
| 2,564,295 | Benz | Aug. 14, 1951 |
| 2,583,930 | Cotton | Jan. 29, 1952 |